April 12, 1966 E. W. SCHLIEBEN ETAL 3,246,126

DATA PROCESSING

Filed Nov. 2, 1960 9 Sheets-Sheet 1

INVENTORS
ERNEST W. SCHLIEBEN
ALFRED S. GUTMAN
CHESTER M. STERN
BY F. J. Sullivan
ATTORNEY

INVENTORS
ERNEST W. SCHLIEBEN
ALFRED S. GUTMAN
CHESTER M. STERN
BY
ATTORNEY

INVENTORS
ERNEST W. SCHLIEBEN
ALFRED S. GUTMAN
CHESTER M. STERN
BY
ATTORNEY

INVENTORS
ERNEST W. SCHLIEBEN
ALFRED S. GUTMAN
CHESTER M. STERN
BY
ATTORNEY

INVENTORS
ERNEST W. SCHLIEBEN
ALFRED S. GUTMAN
CHESTER M. STERN
BY
[signature]
ATTORNEY INVENTORS
ERNEST W. SCHLIEBEN
ALFRED S. GUTMAN
CHESTER M. STERN
BY [signature]
ATTORNEY

INVENTORS
ERNEST W. SCHLIEBEN
ALFRED S. GUTMAN
CHESTER M. STERN
BY
ATTORNEY

April 12, 1966 E. W. SCHLIEBEN ETAL 3,246,126

DATA PROCESSING

Filed Nov. 2, 1960

9 Sheets-Sheet 8

INVENTORS
ERNEST W. SCHLIEBEN
ALFRED S. GUTMAN
CHESTER M. STERN

BY Spencer E. Olson
ATTORNEY

April 12, 1966 E. W. SCHLIEBEN ETAL 3,246,126

DATA PROCESSING

Filed Nov. 2, 1960 9 Sheets-Sheet 9

INVENTORS
ERNEST W. SCHLIEBEN
ALFRED S. GUTMAN
CHESTER M. STERN

BY [signature]

ATTORNEY

United States Patent Office
3,246,126
Patented Apr. 12, 1966

3,246,126

DATA PROCESSING

Ernest W. Schlieben, Ridgefield, Conn., and Chester M. Stern, Sharon, and Alfred S. Gutman, Auburndale, Mass., assignors to Sylvania Electric Products Inc., a corporation of Delaware Filed Nov. 2, 1960, Ser. No. 66,782
14 Claims. (Cl. 235—61.11)

This invention is concerned with electronic data processing systems and particularly with data acquisition equipment for such systems.

In recent years the ability of electronic data processing to solve scientific problems and to relieve drudgery with labor-saving techniques in the fields of data recording, accounting, industrial process control, materials handling, etc. has been widely demonstrated. There is, however, one area of application where its significant potentialities have hitherto been unusable. This is where the system must operate with an input of complex data from an information field located remote from and/or in random orientation with respect to the input sensing devices of the data processing equipment.

Typical examples of these potential data processing applications awaiting solution of reading-at-a-distance problems are automated check-out of customers in self-service retail establishments such as grocery supermarkets, sorting of parcel post packages, and automatic warehousing. In such systems the most efficient manner of providing the necessary input for data processing and control equipment is to obtain pertinent information such as price or address from each item as it passes down a conveyor line or through a work station. Since the items concerned, however, are individually of different size, shape, and height, and are most conveniently arranged in random orientation during these stages of their processing, transducing data from them poses difficult problems. Mechanical or magnetic sensing of the desired information is impractical because these techniques require that a sensing device be brought into proximate relationship and captive alignment with the coded information fields. This is difficult when the areas to be scanned change constantly in horizontal and vertical location as items of different height, size and orientation are processed at speeds as fast as one or more per second. Optical scanning techniques could provide a solution for the problem, but they can be utilized only after difficulties such as changing focal plane and tilt of the information field and random location and orientation of the scanned area with respect to the scanning device have been solved.

Copending U. S. Patent application S. N. 787,757, filed January 15, 1959, now abandoned, discloses a coded label which provides a signal-to-noise ratio of sufficient amplitude and uniformity to offset some of the distortions due to defocusing, thereby solving some of these problems. The principal object of the present invention is to solve others and thus provide an improved system for optical-electronic transducing of data.

Other objects of the invention are to provide for electronic data processing and control systems apparatus which will make it possible to acquire data from information fields located remote from and/or in random orientation with respect to scanning equipment, to provide a mark sensing system in which data may be transduced from an information plane which may be tilted as well as randomly oriented with respect to the scanning plane, and to provide an improved means for data acquisition in electronic data processing systems. Additional specific objects are to provide an automated customer check-out system for self-service sales establishments and an item control system useful in parcel post sorting, inventory and warehouse control, etc.

The manner in which these and related objects are accomplished in one embodiment of the invention will be described as illustrated by an automated sales recorder for the check-out gate of self-service retail sales establishments such as grocery supermarkets.

In this illustrative system the items available for purchase by a customer are individually labeled with a coded indication of their price and other pertinent information. When the customer has selected his purchases and is about to leave the market premises, each item of the total purchase is presented (via a conveyor belt or manually) to a scanner which may be a vidicon type of television camera, a flying spot apparatus, or other optical-electronic transducer.

The area to which the articles are presented is scanned with a search raster until a coded label comes into view and then the scanning raster is oriented with respect to the coded information field by rotating it, in a manner which will later be explained in detail, until the individual component lines of the raster traverse the label in register with the pattern of data coded thereupon. Then, after alignment and proper orientation have been achieved, a gating clock time for the data processing cycle is established, when necessary to compensate for the tilt of the label or to accommodate focal length to optimum size, and the encoded price and other information is automatically read from the item under scan and processed to a cash register or other type of sales recorder.

Other objects, features, and embodiments of the invention will be apparent from the following detailed description of this illustrative system and reference to the accompanying drawings, wherein.

Figure 6:
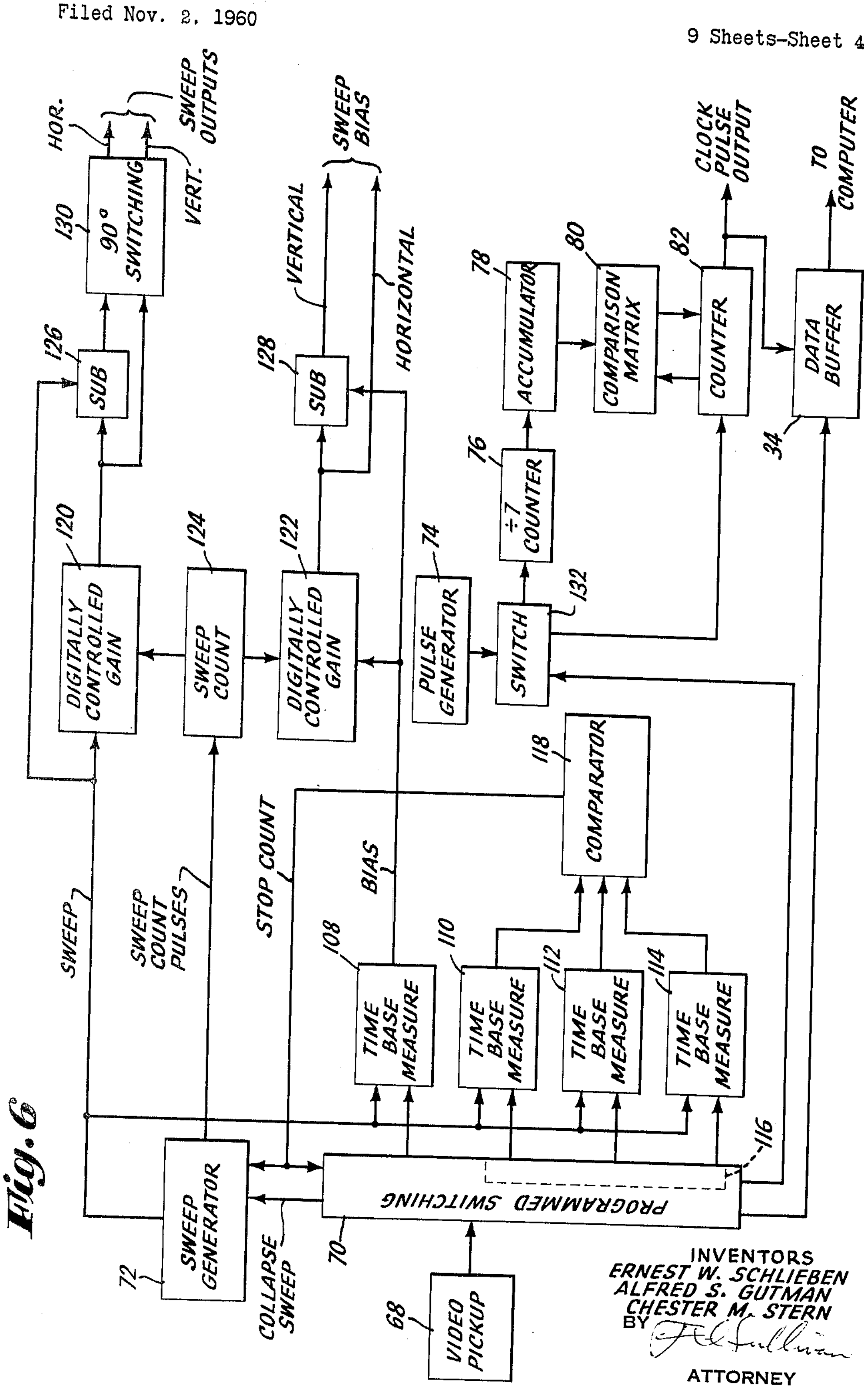
FIG. 6 is a block diagram of a scan control subsystem for the apparatus of the preceding figures.
Figure 10:
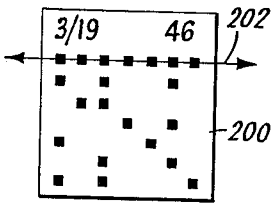
Figure 10:
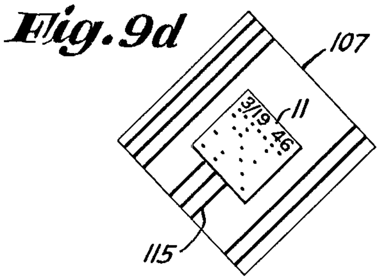
Figure 11:
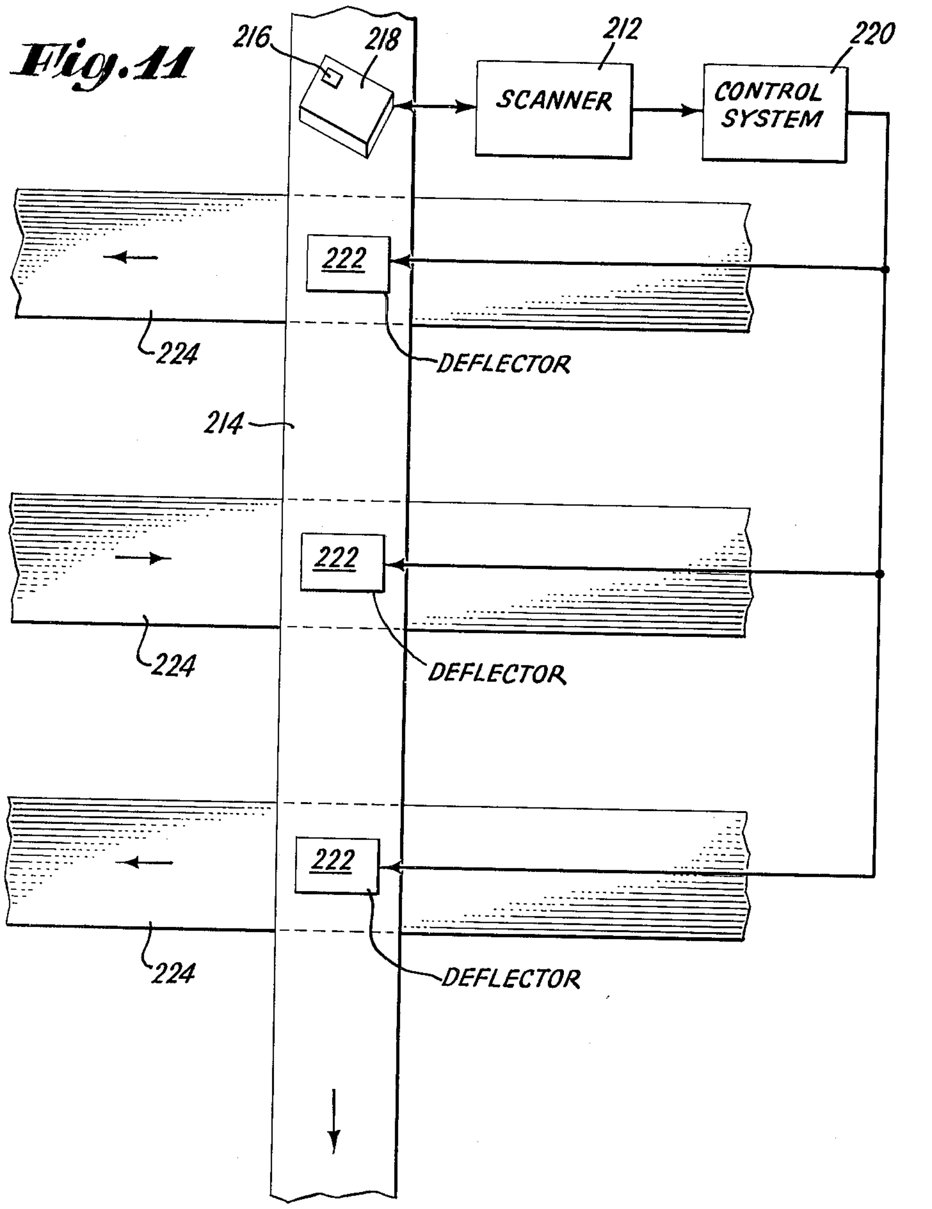
Figure 12:
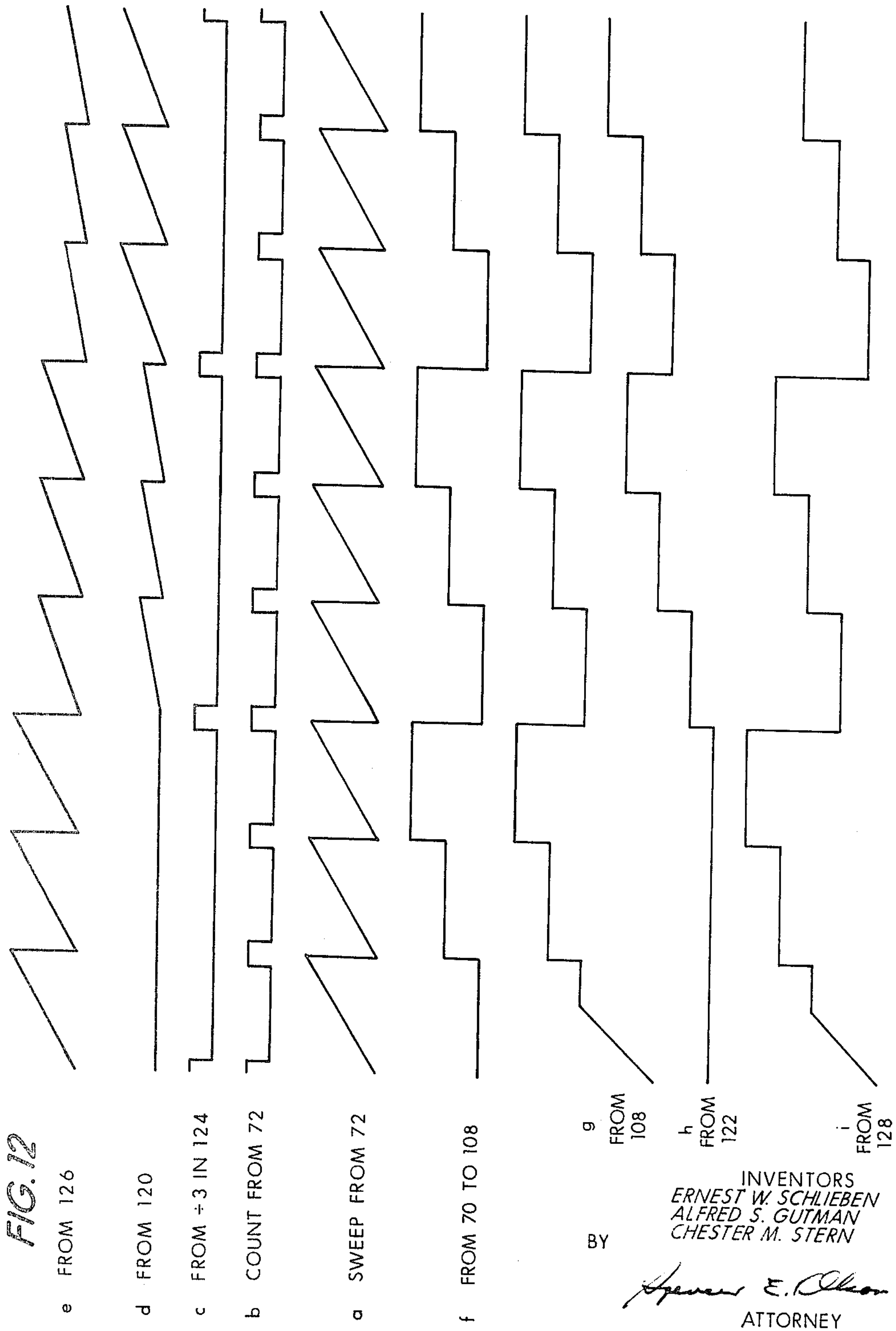
Figure 13:
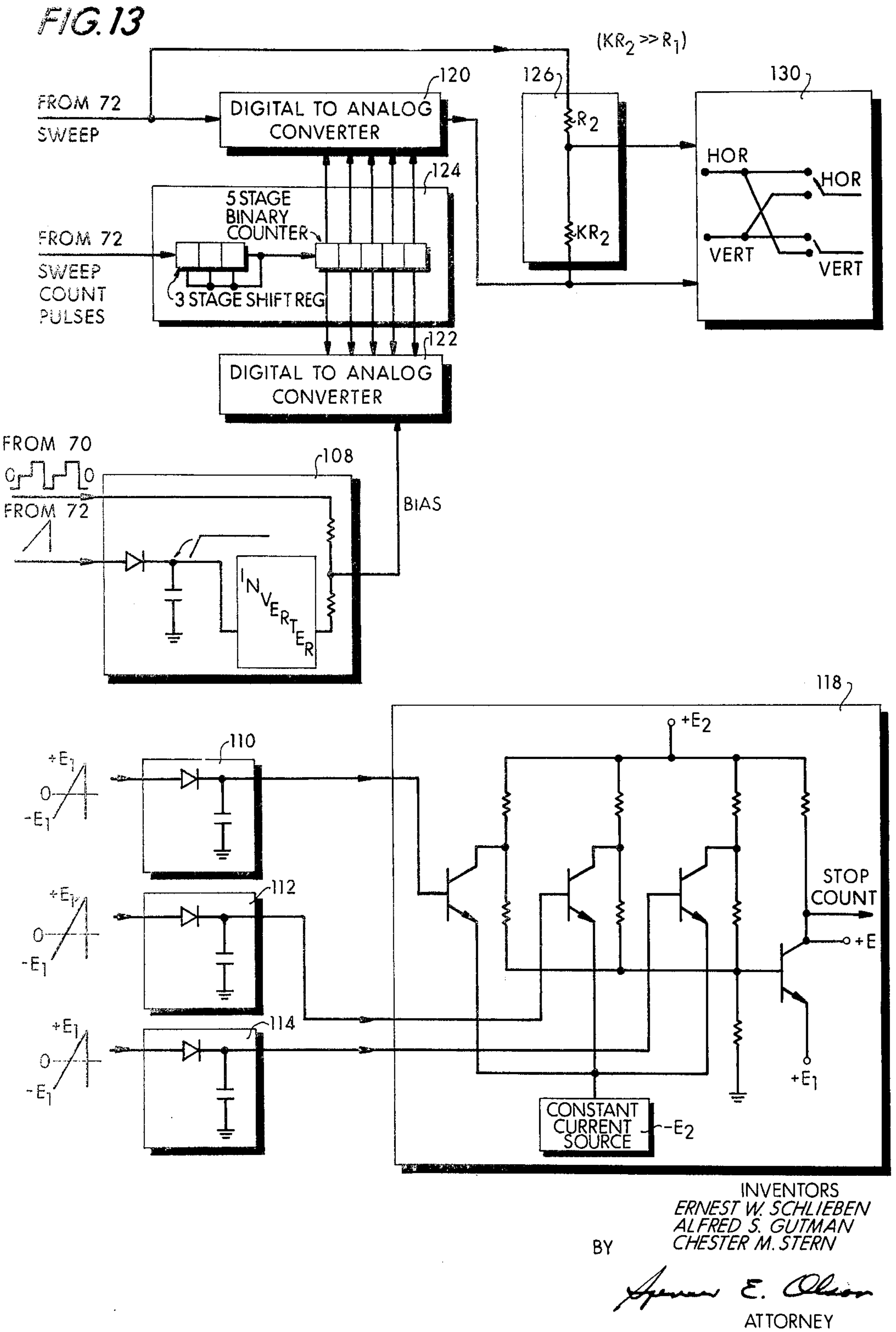

FIGS. 8*a*–8*e* are diagrammatic representations of various label tilt-to-scan attitudes;

FIGS. 9*a*–9*f* are diagrammatic representations of a scan-to-label orientating and alignment procedure;

FIG. 10 is a diagrammatic representation of a label undergoing an alternative scan alignment technique;

FIG. 11 is a diagrammatic representation of the invention as employed in a materials handling application (e.g. parcel post sorting);

FIG. 12(*a–i*) is a series of diagrammatic representations of signal pulses and waveforms generated by the apparatus of FIG. 6 to rotate the scanning raster in the manner shown by the various diagrams of FIG. 9(*a–f*); and FIG. 13 is a more detailed diagrammatic representation of some of the component blocks of the diagram of FIG. 6.

EQUIPMENT IDENTIFICATION

In a grocery supermarket employing an automated check-out gate utilizing one embodiment of this invention, merchandise is displayed on open shelves where it is selected by the customer and carried by hand or baskart to a check-out station in the usual self-service operation.

Figures 1, 2:
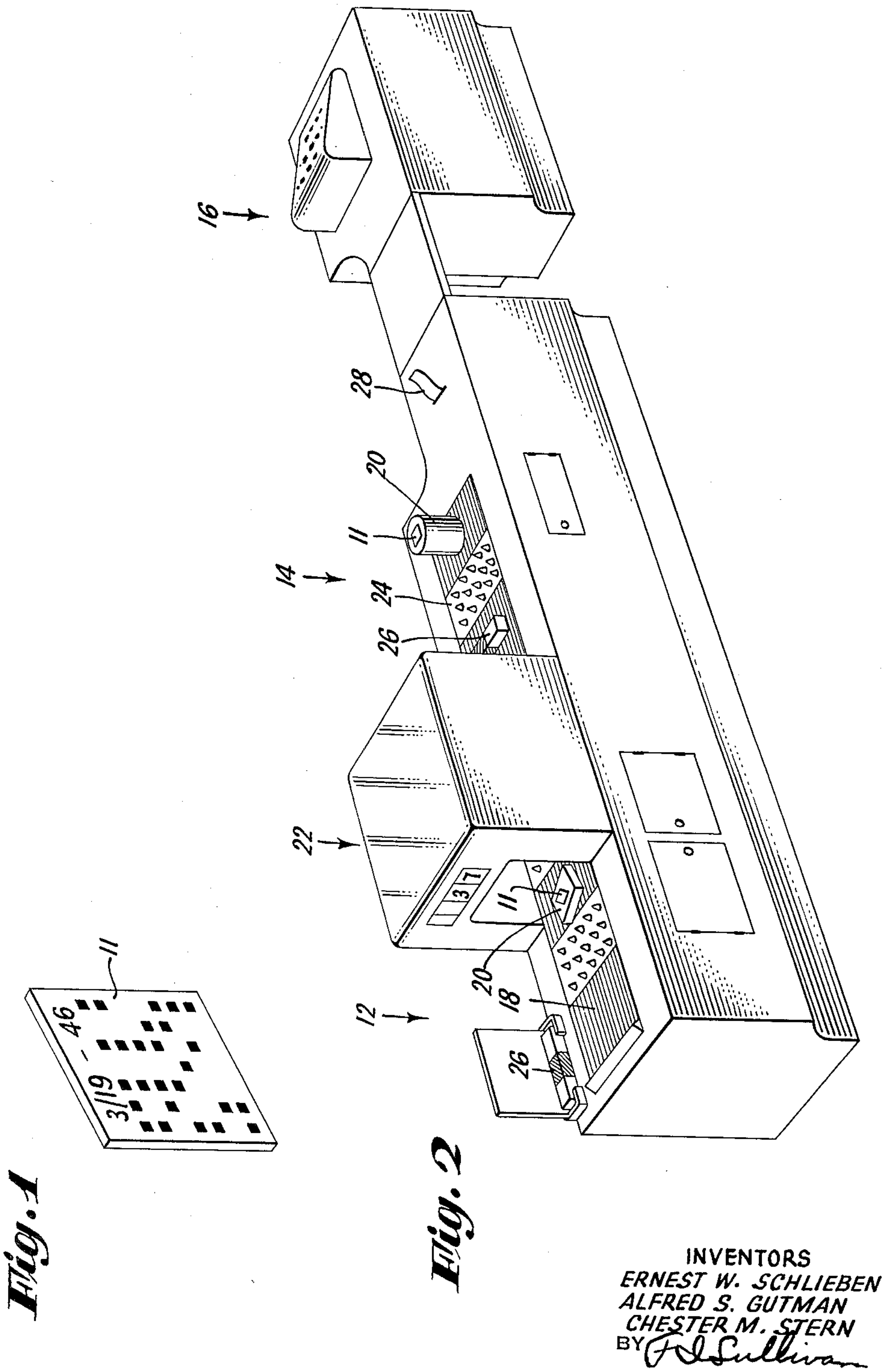
FIG. 1 is a diagrammatic representation of a label having binary coded price and other information for goods merchandised in a supermarket utilizing one embodiment of the invention.
FIG. 2 is a perspective view of an automated checkout gate for a supermarket.

Instead, however, of the price for each item being ink-stamped upon it, a specialized label 11 of the type shown in FIG. 1 is employed. The characteristics of this label are explained in detail in the copending U.S. patent application referred to previously. Briefly, it consists of an adhesive-backed fluorescent coated paper with alpha-numeric indication of price, department, tax information, etc. printed upon it and the same information binary coded in the form of punched holes or opaque overprint in the fluorescent information field. The labeled items are processed through a check-out gate of the type shown in FIG. 2 which includes a customer loading station 12, a bagging station 14, and a cashier station 16. A belt type conveyor 18 is employed to carry the customer's purchased items 20 from the loading station 12 through a label scanning station 22 to the bagging station 14. As an accommodation to being scanned by a raster of straight lines the label, although it may be tilted, should lie in a substantially flat plane and should be at a substantially infinite focal length from the scanner to avoid perspective and parallax distortions.

The customer arriving at the loading station 12 of this check-out gate places the merchandise which he has selected on the conveyor, label up, and a store employee at the bagging station 14, by means of a foot pedal or other convenient control (not shown) operates the conveyor 18 to carry the merchandise at proper speed through the scanning station 22. Areas 24 comprised of upright resilient cones formed from rubber or suitable plastic material, are provided on the conveyor to hold round objects such as fruits or vegetables in a stationary position, thereby preventing them from rolling or tumbling as they are carried through the scanning station. A switch (not shown) or separators 26 consisting of a block of wood or other supporting member covered by an appropriately coded label may be employed to indicate to the scanning equipment 22 the separation between different customer's orders as items are processed one at a time through the scanning station 22 to the bagging station 14. Packing at station 14 is a continuous operation with previous items in an order being bagged while later items are still being processed from the baskarts and through the scanner.

As each item passes through the scanning station 22 its price and oher encoded data are transduced from its label, automatically printed on a customer's sales slip 28, and acumulated in appropriate registers of a computer. Then, after the last item in an order has been processed and bagged, the computer makes the necessary additions and other calculations and the customer is handed a sales slip with his packed order and settles his account at the cashier's station 16.

The physical arrangements and working assignments at this check-out station are flexible. For example, instead of the arrangement shown, the cashier's station 16 may be turned at right angles to the end of the conveyor line and a single employee, during periods of light customer traffic, can perform both the bagging and the cashier functions. In another arrangement, a single cashier station 16 may be located at a point where it can service two or more of the automated check-out gates. At times of peak customer traffic two or more persons may work the bagging station 14 and a customer's helper may be assigned to the loading station 12 to take full advantage of the potential processing speed of the system. Also, the items to be checked out need not be carried on a conveyor through the scanning station 22, but may be presented directly to the scanner by hand as a part of the bagging operation.

Figure 3:
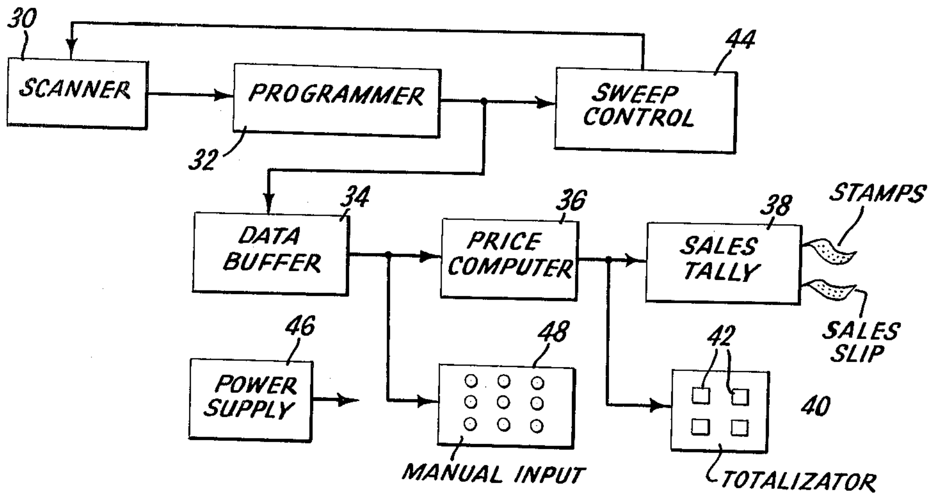
FIG. 3 is a functional block diagram of an electronic data processing system for the check-out gate of FIG. 2.

A block diagram of the equipment employed in the automated sales recording operation at the check-out gate under description is shown in FIG. 3. It features a scanner 30 which converts optical signals derived from the label 11 carried by each item 20 into electronic signals which are processed through a programmer 32 and a data buffer 34 to a price computer 36 operating a sales tally device 38 and a totalizator 40 which contains a plurality of counters 42 adapted to keep running totals of such information as sales tax data, gross and department sales, etc. Data transduced from the label is also processed through the programmer 32 and a sweep control subsystem 44 to control the operation of the scanner 30 in a manner which will be explained in detail below. The equipment at the check-out gate also includes a system power supply 46 and a manually operated keyboard for inserting price and other data into the computer 36 if an unlabeled item arrives at the check-out station or a label cannot be read by the scanner 30.

Figure 4:
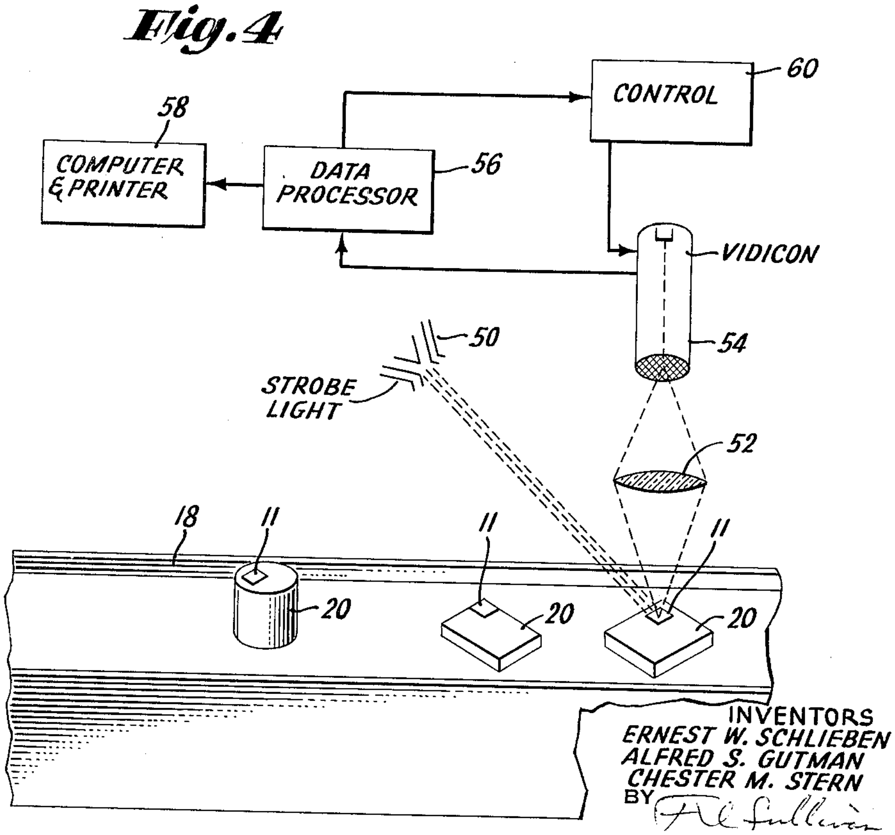
FIG. 4 is a diagrammatic representation of a vidicon type of scanner useful in the system of FIG. 2.

As mentioned previously, the scanner which transduces the coded data from the label 11 may be a vidicon or other TV camera device, or a flying spot apparatus. FIG. 4 shows an arrangement wherein the labels 11 on items 20 carried by the conveyor 18 are irradiated by energy from a source 50. The image of the irradiated label is focused by a suitable optical system 52 onto the target electrode of a vidicon camera 54 where it is translated to electronic signals which are conducted through a data processor 56 to a computer and printer system 58 and a vidicon scan control system 60. The vidicon camera may be equipped with a shutter or strobe lighting system to prevent motion of the label from blurring the scanned image.

Figure 5:
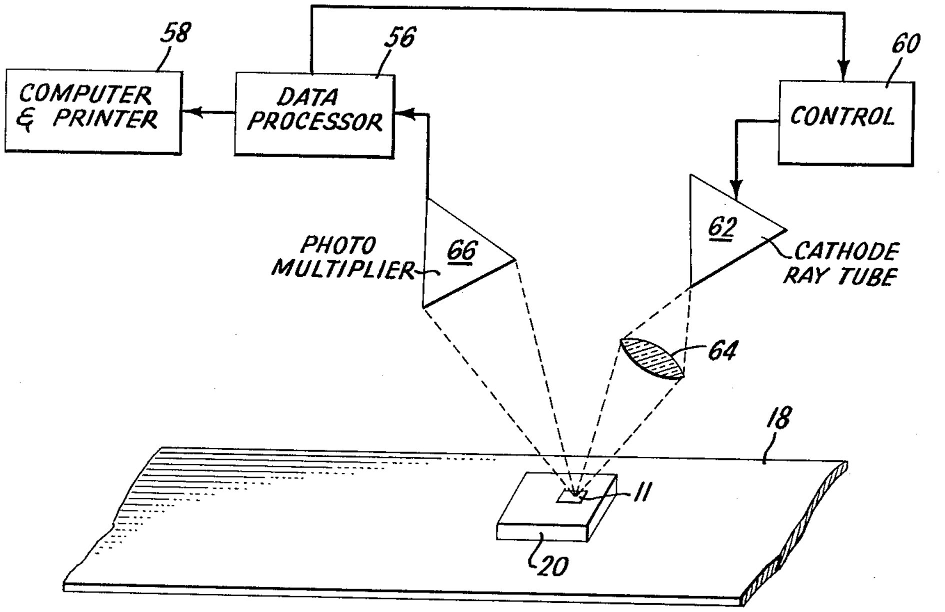
FIG. 5 is a similar representation of a flying spot scanner for the system of FIG. 2.

FIG. 5 shows a flying spot alternative to the system of FIG. 4. Here, each label 11 carried by an item 20 is irradiated by a flying spot focused from the face of a cathode ray device 62 through an optical system 64. As this flying spot of light scans a raster upon the surface of the label 11, a photomultiplier device 66 translates the information encoded thereon into electronic signals which are conducted to a data processor 56, a computer and printer 58, and control apparatus 60 similar to those employed with the vidicon arrangement.

BRIEF OPERATING DESCRIPTION

Figure 7:
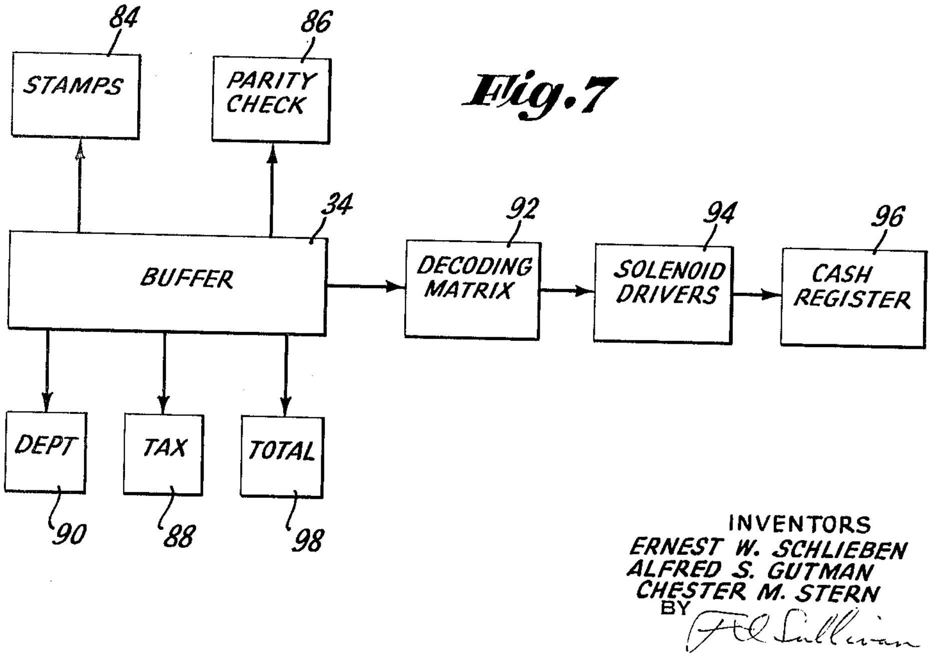
FIG. 7 is a block diagram of a data processing subsystem for this check-out gate.

In either a flying spot or vidicon embodiment of the system, the data encoded on the label may be optically sensed and electronically transduced into the required accounting information by means of the scan orientating and data clocking and gating subsystems diagrammed in FIG. 6 and the computing equipment diagrammed in FIG. 7.

The scan orientating subsystem shown in FIG. 6 includes a video signal pick-up circuit and amplifier 68, a programmed switching circuit 70 for routing video signals derived from the label to the proper circuits at the proper times, a sweep generator 72 for providing the necessary deflection waveforms to produce the scanning raster, and a combination of time base measuring and digitally controlled gain circuits for adjusting the sweep waveforms to cause the scanning electron beam to first locate a coded label presented to its field of view and then produce a scanning raster properly orientated and aligned to read the data encoded on the label.

The data clocking and gating subsystem diagrammed in FIG. 6 includes a combination of circuitry adapted to provide clocking pulses which gate the overall system to be sensitive in discrete sequences to the input of video signals at the critical time when the scanning raster is traversing each one of the assigned code areas in the fluorescent information field. To illustrate this requirement, examination of the label shown in FIG. 1 reveals that its information content is encoded by the presence or absence of holes punched through the fluorescent field in discrete areas arranged in horizontal rows and vertical columns. As will be explained in more detail subsequently, if a label is tilted, it becomes foreshortened in the optical view of the scanner and the distance between information bits is effectively reduced. This means that the gating signals for transducing the coded data must be caused to occur closer together, the closeness of the gates depending upon the tilt of the label. The system under description generates gating clock pulses by providing a train of reference signals from a pulse generator 74 for the length of time that it takes a raster line to traverse the label being read, dividing this pulse train by means of a counter 76 with a count down divisor of 7 (the number of encoded areas along each scan line on this particular label) to provide a control reference in an accumulator 78 which operates through a comparison matrix 80 to convert the proper pulses from the pulse generator 74, as they pass through a clock counter 82, into system gating and clock signals. The exact manner in which this is accomplished will later be explained in more detail.

The video information signals from the label, properly gated, are conducted through appropriate serial-to-parallel conversion and decoding circuits to the buffer storage register of the computer system diagrammed in FIG. 7. This register takes into its various stages electronic signals corresponding to the binary coding of the data in the information field of the label. If we assume seven rows and seven columns of data, register 34 may consist of forty-nine stages. Some of the information bits may be employed to indicate to an automatic stamp dispenser 84 whether a customer is to be awarded premium stamps for the purchased item carrying the particular label under scan. The contents of other stages holding data from given groups of information areas on label 11 may be compared with an odd (or even, if desired) parity check circuit 86 to determine whether an error has been made in reading the information from the label. Another information bit may be employed to indicate to a tax accumulator 88 whether or not the monetary value of this particular labeled item is to be included in sales tax computation. Two or three of the information bits may be employed to operate a department decoding matrix 90 to route dollars and cents credit for this particular sale to a totalizator for the correct department such as meat, grocery, produce, etc. and the remaining bits may be processed through a decoding matrix 92 to actuate a system of solenoid drives 94 which may be employed to operate the key mechanism of a cash register 96. Also, appropriate connection may be made from those stages of register 34 which hold the price information to an accumulator 98 which keeps a running total of all sales processed through the system.

Although the equipment is being described as an input to a modified cash register, it is readily apparent that it may also be employed with more sophisticated types of electronic output devices employing electronic computation and print-out equipment, and may be connected to automatic inventory control systems, etc. Also, a customer's identification card fabricated in part like the labels 11 and appropriately coded may be used in place of the order separator 26 to initiate an input to a credit accounting system at the same time that it signals end of order.

SCAN ORIENTATION

Figure 8A:
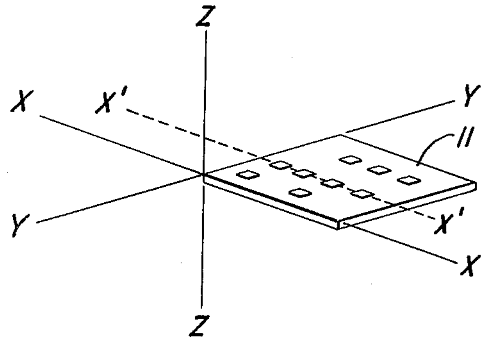

The geometric problems involved in orienting the scanning raster of the data transducing equipment to the format of encoded bits of the information field of a label 11 are demonstrated by the various label attitudes of FIGS. 8*a*–8*a*.

Figure 8D:
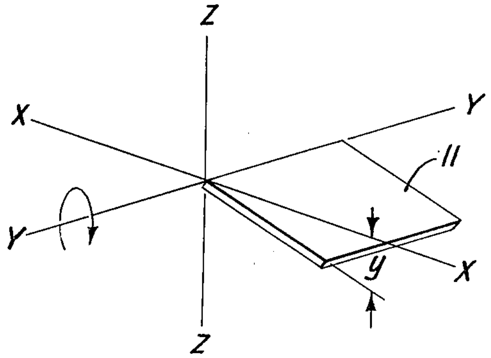
Figure 8B:
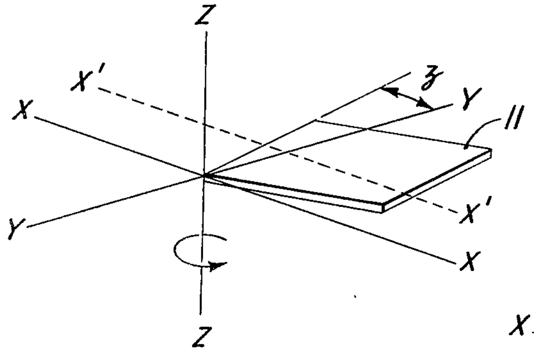
Figure 8E:
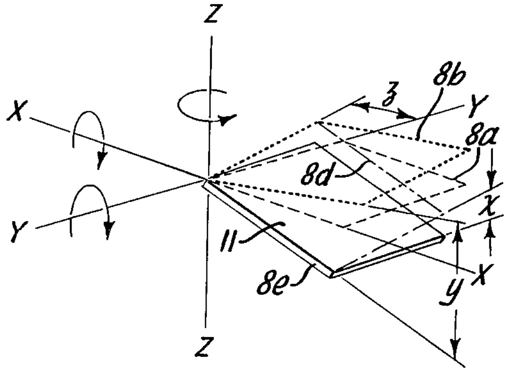
Figure 8C:
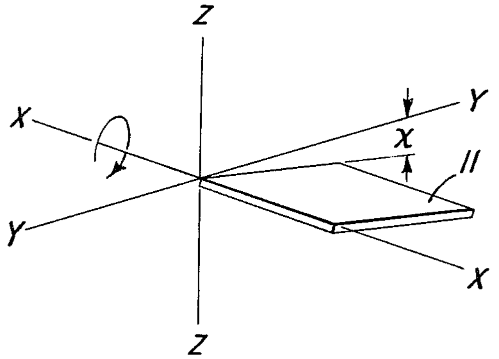

FIG. 8*a* shows a label in ideal position with reference to the optical axis Z—Z of the scanning system. The label is represented as lying level in a horizontal plane orthogonal to the Z axis with one edge on a line X—X parallel with the scanning raster lines X′ and the other edge on a line Y—Y perpendicular to this scan. Lines Z—Z, X—X and Y—Y intersect at a common point. FIG. 8*b* shows the label rotated about the Z axis through an angle *z*. FIG. 8*c* shows rotation about the X axis through an angle *x*; and, FIG. 8*d* shows rotation about the Y axis through an angle *y*. The most frequently occurring situation, however, is that shown in FIG. 8*e* where the label is tilted and turned with respect to all of the referenced axes.

As has been explained, in order to read the information field with a scanning beam, it is necessary to: first, define a scanning raster in the area of the label; second, align the raster so that its component lines run colinear or relates in some other systematic fashion with either the rows or the columns of coded information on the labels, i.e., overcome orientation around the Z—Z axis; and, third, make proper adjustment and/or division of scanning time to compensate for the foreshortening effect of a tilt around the Y axis as demonstrated by FIG. 8*d*. The greater the angle *y*, the shorter the period of time that a row of marks will be in view of a constant speed scan and consequently the shorter the spacing required between data reading clock pulses.

The technique of controlling the scanning raster in cathode ray devices employing either electrostatic or electromagnetic deflection is well known to those skilled in the electronic arts which employ cathode ray tubes as information or display devices—for example, radar and television. Consequently, there is no need to burden this description with details of how various types of rasters are produced and altered. It is sufficient for present purposes to explain the desired effects and indicate conventional methods of accomplishing them.

LABEL LOCATION

In the operation of the system diagrammed in FIG. 6 to orient the scanning raster of a cathode ray device so that it will overcome the difficulties inherent in the problem of reacting canted labels, as represented by FIG. 8, and be aligned colinear with a rectilinear information field of the type demonstrated by the label 11, it is first necessary to detect the presence of a label within the optical view of the scanning mechanism. This is accomplished in one method of operation by scanning in a search raster until the video output of the signal detecting device 68 (FIG. 6) associated with the equipment indicates, by exceeding a given threshold limitation, that a fluorescent label information field has been detected (see FIG. 9*a*). For purposes of bandwidth economy this search cycle may be performed with a single scan line (if the items scanned move across the scanner's field of view) or with a relatively coarse raster (if the labeled item is not moving) which may be collapsed after a label is detected and aligned to apply the full bandwidth potential of the scanning system to the specific area of the label during the data reading cycle.

Figure 9A:
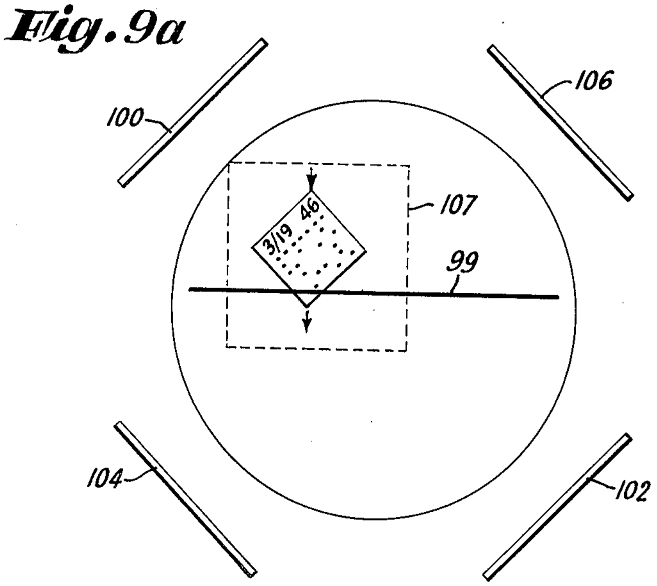

Referring to FIG. 9*a*, a label 11 is shown approaching intersection with a label search scan line 99. Following conventional cathode ray beam scanning techniques, this line may be produced by applying from the sweep generator 72 of FIG. 6 to the horizontal deflection plates 100, 102 and the vertical deflection plates 104, 106 of the electrostatic deflection system of a flying spot scanner saw tooth waveforms of similar phase and equal amplitude. If we assume that the line 99 is scanned substantially across the direction of motion of a conveyor carrying labeled items and the items are located at random on the conveyor, we can expect the label to intersect the line 99 at any point along its time base. The point of actual intersection for each particular label may be determined by a time base measuring device 108 as indicated in FIG. 6. Such a device may comprise a conventional linear sweep generator with a diode pick-off charging a capacitor. Successive sweeps of this time base measuring device are caused to start coincidentally with each scan line 99, and when the line is intercepted by a label, the device 108 actuates suitable control circuitry to convert the distance from start of scan to point of intersection into proper initial bias settings of the scan deflection system for causing the scanning raster to be limited to an area centered with reference to the label, as represented by the dotted lines in FIG. 9*a*.

Figure 9E:
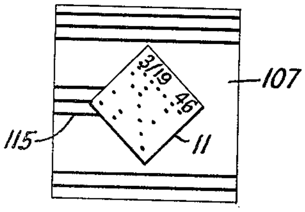
Figure 9B:
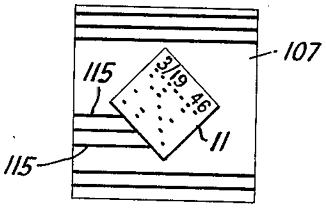

Once this bias setting is determined, the rectilinear scanning raster 107 of FIG. 9*b* is produced. In one type of operation, this raster may be produced by the conventional combination of a relatively fast saw tooth waveform (to produce the scan lines) and a relatively slow saw tooth waveform (to cause the lines to form the raster) applied to both sets of deflection plates. By means of time base measures 110, 112 and 114 shown in FIG. 6, the time from the start of different scan lines 115 of the raster 107 to its intersection with the label is measured. These measuring circuits may comprise sweep charged capacitors similar to those employed in device 108 and may be controlled by a subsystem 116 within the programmed switching system 70 to connect the necessary start of scan and label intercept signals of separated sweeps of the raster to the different time base measuring circuits 110–114.

RASTER ROTATION

If the label 11 should lie with any of its four sides parallel to a line along the starting points of the individual scan lines which comprise the raster 107, the distances of the three measured scan lines 115 to their point of impact with the label will be equal (as shown in FIG. 9*d*) and a comparator circuit 118 will indicate equal signal outputs from time base measurements of circuits 110–114. Any practical comparator known to those skilled in the art may be employed to perform this function; e.g., a combination of AND gates sensitive to equal amplitudes of signal input from the RC time constant circuits of the time base measuring devices.

If, however, the scan lines from the edge of the raster to the edge of the label are unequal in length, the raster 107 is rotated as shown in FIG. 9*c* and new measurements are made by circuits 110–114. This process is repeated in a constant sequence until three substantially equal time base measurements between the edge of the raster and the edge of the label indicate an orthogonal scan-to-label relationship. Although two equal scan lines to one side of the label indicates the desired relationship, three are employed to avoid the error which could result from a straddled corner, as shown in FIG. 9*e*.

Rotation of the raster to accomplish this purpose is performed in discrete steps, e.g. angles of one degree, by adjusting the relative bias and amplitudes of the sweep voltages applied to the cathode ray beam deflection circuits with digitally controlled gain devices 120 and 122 which are operated by a sweep counting circuit 124. In accordance with conventional techniques, the direction of the lines 115 is rotated counterclockwise by subtracting from the amplitude of their horizontal deflection waveforms, via circuit 126, the same factor which is added to their vertical deflection signals by the digitally controlled gain 120. Similarly, the starting and stopping points of these lines is adjusted to define the leading edge of the rotated raster by subtracting from their vertical bias, via circuit 128, the same factor which is added to their horizontal bias by digital gain 122.

Figure 9F:
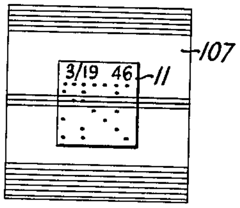
Figure 9F:
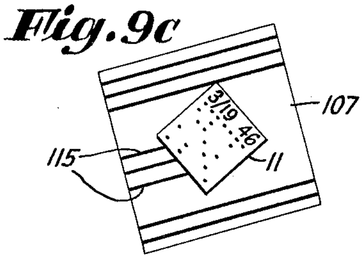

Once orthogonal relationship of the scanning raster to one edge of the label is established in this manner, the raster is rotated 90°, as shown in FIG. 9*f*, so that its component scan lines traverse the label parallel to this edge and thus colinear with the rows of coded areas in the information field. This maneuver is required because, as has been exlained previously, the label may be tilted with respect to the scanning plane and, consequently, present the characteristics of a parallelogram instead of a rectangle to the scanning operation with the result that a scan line orthogonal to one edge may traverse the label on a diagonal instead of traveling colinear with the rows of information encoded thereupon.

The 90° rotation is accomplished, in a conventional manner, by means of a switching system 130 which applies what had been the horizontal deflection waveforms to the vertical deflection system and vice versa. If an expanded raster has been used during the search and alignment cycles it may now be collapsed, as shown in FIG. 9*f*, for the data reading cycle. Although many techniques are known for implementing the various component blocks of the diagram of FIG. 6 to perform the functions recited for rotating the scanning raster in the manner shown in FIG. 9(*a–f*), the following is a brief description of one illustrative combination of circuits which might be employed to accomplish this purpose.

FIG. 12*a* shows a conventional sawtooth waveform from the sweep generator 72. Each sawtooth signal may be counted, e.g. by differentiating its fly-back trailing edge, to produce the serial pulse train of FIG. 12*b* which is applied to the input of the sweep count circuit 124. As shown in FIG. 13, this circuit may be comprised of a three-stage pulse shifting register connected between the input which carries the pulse train *b* and a binary counter. Thus, for each three pulses in the FIG. 12*b* sequence which are processed through the three-stage shift register a single pulse input is provided to the counter; and, as shown in FIG. 13, a CLEAR signal simultaneously resets all stages of the shift register to ZERO condition. The effect is a conventional three-to-one dividing operation so that three successive scans may be performed, in the manner described above, before the sweep and bias are adjusted to rotate the raster. A five-stage binary counter is shown in FIG. 13, but any suitable size may be employed to provide the range of gain desired.

The digital output from the counter 124 is applied to gain controls 120 and 122 which may be conventional digital-to-analog converters, for example, of the well known ladder type described in the publication Numerical Control of Machine Tools by the Servomechanism Laboratory of the Massachusetts Institute of Technology in 1954. The gain circuit 120 employs the output of the counter 124 to gradually decrease the amount of attenuation which it applies to the full amplitude sweep signal from generator 72 in gradual increments, each embracing a three sweep interval, to produce the waveforms shown in FIG. 12*d*. This gradually increasing sweep signal is applied to the vertical deflection system of the scanner, and the subtraction circuit 126 supplies to the horizontal deflection system a series of sweep signals which are gradually decreased by a similar amplitude in corresponding three sweep groupings as shown in FIG. 12*e*. FIG. 13 shows how circuit 126 may accomplish the required subtraction by applying the full amplitude sweep signal from generator 72 to the top, and the output of the digitally controlled gain to the bottom, of a voltage dividing resistor network which has its output connected to the horizontal deflection system with resistor $KR_2$ of the network considerably higher in value than resistor $R_2$. In this network, the output gradually diminishes from substantially the full amplitude of the sweep signal shown in FIG. 12*a* as the output from the digitally controlled gain 120 gradually increases in the manner shown in FIG. 12*d*. Thus, the amount of sweep amplitude added to the vertical deflection system is subtracted from the horizontal deflection system in corresponding gradual increments for each group of three successive sweeps to accomplish the counterclockwise rotation desired.

After the proper amount of rotation has been accomplished, so that the leading edge of the scanning raster is parallel with the edge of the information field, the 90° switching indicated by circuit 130 of FIG. 6 is performed by simply interchanging the input connections of the horizontal and vertical deflection systems in the manner shown in FIG. 13.

As explained previously, the time base measure 108 of FIG. 6, by sensing first contact with the label, produces the initial bias setting for the scanning raster 107 of FIG. 9*a*. As shown in FIG. 13, this desired bias may be obtained from the midpoint of a resistive adder which has its bottom end connected, via an inverter, to the capacitor charged by the sweeping voltages which detected the presence of the label and its top end connected to the cyclically reoccurring three-step voltage signal provided from the programmed switching system 70 and shown in FIG. 12*e*. This three-step signal is added, by the resistive adder, to the bias for each of the three successive sweeps measuring the distance to the label (via subtraction unit 123 to the vertical deflection system) so that each successive one of these three sweeps will lie above and parallel to its predecessor as shown at 115 in FIGS. 9*b–e*. FIG. 12*f* shows the effect of this waveform being cyclically superimposed upon the output of the sweep-charged capacitor within the circuit 108 which may be assumed to have risen from O to *f'* during the label seeking operation that established the initial bias setting.

In order to produce the rotation shown in FIGS. 9*c* and 9*d*, the bias setting must be adjusted so that after each group of three sweeps, the initial starting point will be moved downward and toward the right to accommodate the counterclockwise rotation indicated in these figures. This is done by adding to the horizontal bias stepped increases derived from the digitally controlled gain 122 for each successive group of three sweeps. This effect of the initial bias setting *f'*, the stepping signals shown in FIG. 12*f*, and the digital increases from gain unit 122 is shown in FIG. 12*h* which represents the bias applied to the horizontal deflection system. FIG. 12*i* shows how a corresponding decrease in bias is produced for the vertical deflection system which gradually lowers the output level from time base system 108, by steps corresponding to the increases in horizontal bias, to produce an equivalent decrease in vertical bias and thus complete the counterclockwise rotation desired. To accomplish this, subtracting circuit 128 is constructed, and operates, similar to the circuit shown in FIG. 13 for subtractor 123.

As indicated previously, the function of time base measures 110–114 and comparator 118 is to provide a STOP COUNT signal to the sweep generator 72 when the edge of a label is intercepted at an equal distance from a common base line by three successive sweeps. FIG. 13 shows an illustrative combination of circuits by which this may be accomplished. Each of the time base measuring circuits 110, 112, and 114 is comprised of a transistor having an input conection to its base electrode from the sweep-charged capacitance with which it is associated. A constant current source is connected in a common emitter configuration to each of these transistors thereby providing a conventional comparison circuit. In this circuit, if the input sweeps are unequal, the transistor which has the highest amplitude of input signal applied to its base electrode conducts because this transistor, due to the common emitter configuration, back biases the base-emitter diodes of the remaining transistors. If, however, equal sweep amplitude signals arrive at their respective base electrodes, no such back biasing occurs and all three transistors conduct. The collectors of these three transistors are each connected to three corresponding resistive inputs to an AND circuit which is comprised of a single transistor having its output connected to the STOP COUNT conductor.

In this AND circuit, the output transistor will conduct as long as current flows through any of its three resistor input circuits to the ground potential applied, via a biasing resistor, to the transistor base. When any of the transistors in the comparison system become conductive, they shunt their respective conductive path away from the AND gate transistor to the constant current source while the remaining non-conductive transistors (or transistor) preserve the bias on the output transistor and keep it conducting; but, when all three comparison transistors are conducting to indicate equal sweep inputs, the output transistor becomes reverse-biased and cuts off. This raises the potential at the collector of this transistor from $E_1$ to $E_2$ and thus produces the STOP COUNT signals.

DATA READING CLOCK TIME

The scanning system at this point is generating a rectangular raster which is aligned with the information field. Before data is transduced, however, the equipment under description provides for deriving from the label certain control information which makes it possible to gate the system with clocking signals so that the presence or absence of a signal at different given points along a scan line can be interpreted as bits of binary information. If we consider that the information field of the label 11 is arranged in seven equally spaced rows and columns, it will be appreciated that, as the effective length of the label in the direction of scan is varied in accordance with its degree of tilt with respect to the scanning plane (FIG. 8*d*), or by focal distance, it becomes necessary to vary the clocking rate of the data reading gates to correspond with the variations between the areas of information bits. This is accomplished with the equipment diagrammed in FIG. 6 by an effective division of the scanned length of the label into seven discrete areas along each scan line, using gating and clocking circuits 74–82.

In the operation of these circuits the first step is the processing through the counter 76, under control of an edge of label activated switch 132, of a train of pulses which are derived from the pulse generator 74 and are coexistent in time with the scanned length of the label. If we assume as an example that the counter 76 has a count down ratio of 7 (the number of columns of information bits and consequently the number of gating pulses desired per scan line) and that the generator 74 is producing pulses at a 300 kc. rate, 210 pulses will be delivered to the counter 76 and $210 \div 7 = 30$ pulses will be relayed to its output accumulator 78 if a label scan should take, for example, 700 microseconds. Since the accumulator 78 provides a binary indication of its total count and it is advanced one count for each pulse arriving from the counter 76, it represents its 30 pulse input of this example by a binary setting of 11110 (the binary representation of decimal 30) in its component stages. This setting forms one input to the comparison matrix 80 which has as a second input the binary count of individual 300 kc. pulses from the generator 74 arriving, through the switch 132, at the counter 82. Each time that the counter 82 accumulates a setting of binary 11110, i.e. decimal 30, as a result of counting its input pulses, matrix 80 converts the resulting coincidence with the setting from the accumulator 78 into an output clocking pulse for gating the translation of data from the label, and counter 82 is reset to zero.

The preceding provides one reliable digital technique for effectively dividing what may be variable lengths of label by the number of binary coded information areas across the label. If the number of such rows is increased or decreased, the count down ratio of counter 78 must be similarly adjusted.

When the scanning raster has been aligned with the information field and data gating clock time has been established, the output of the video signal output circuit 68 is connected, via programming switch 70, to the buffer input 34 whence it is utilized to operate the computer portion of the system in the manner previously described.

ALTERNATIVE METHOD OF ORIENTATION

An alternative method of accomplishing scan alignment with the label and deriving clocking data from it may be described with reference to the label diagrammatically represented in FIG. 10. On this label 200 one of the four edge rows or columns of information bits is assigned to the alignment and gating function. As shown, it is punched to provide a signal indication in each of its seven assigned information areas, and the coding of the remainder of the label is so arranged that all of the other edge rows or columns of the information field have at least one bit area coded by the absence instead of the presence of a signal indication. In addition, precaution is taken so that no scan line on a diagonal across two or more rows or column of information bits can result in as many as seven signal indications.

With this format provided for the information field of the label it becomes possible, after the preliminary steps of locating the label and localizing a scanning raster with respect to it have been accomplished, to rotate the raster in the manner previously described until a sequence of seven information bit signals is detected on a single scan 202 across the label. This indicates that alignment has been achieved, and the relative occurrence in time of these seven signals can be utilized to establish gating clock time for the data reading cycle.

Although the invention has been described as embodied in one illustrative example of an automated checkout gate for self-service grocery supermarkets, it is equally useful in other embodiments for this same purpose and in other applications. The scan alignment and other features illustrated are applicable to other types of label and code patterns, and may be employed in various types of control and automated systems. For example, FIG. 11 shows diagrammatically one of these applications in a parcel post or warehouse sorting system where a scanner 212 located alongside a moving conveyor 214 transduces data from an information field 216 on conveyed items 218 to be sorted and transmits this data to a computer or control system 220 which actuates the correct deflector 222 to move the scanned item from the conveyor to a second cross conveyor 224 or other outlet.

Also, the scanner may operate with other types of data input and other data processors. For example, the price and other data on the label can be replaced by an identification number for the item under scan and this number can be decoded to provide access to the appropriate location in a memory file such as a magnetic drum or disc for updated information as to current price, inventory adjustment, etc.

In its broad aspect the invention is not confined to specifics of vidicon, flying spot or other types of optical-electronic data transducers such as Nipkow discs but relates to the overall problem of converting data in a first format, such as the positional representation of coded label, into a second format such as a pulse train of electronic signals and features the basic concept of transducing data by scanning the first format with a raster which is controlled by data acquired from the information field of the first format as a function of the scanning process. Consequently, it is not limited to the illustrative embodiments, features, and fields of utility which have been described and referred to, but encompasses the full scope of the following claims.

What is claimed is:

1. For automated processing of data recorded upon information fields located in random orientation: a scanning station; means for processing said fields at said station; a field scanning device at said scanning station adapted to produce a data translating scanning raster; and, means for controlling the direction of scan of said device to conform the orientation of said raster to said random orientation of the field under scan.

2. For automated sales recording of labeled articles placed with random label orientation upon a conveyor: a scanning station; a conveyor movable through said scanning station; a label scanning device at said scanning station; and, means for controlling the direction of scan of said device to conform to said random orientation of the label being scanned.

3. For automated processing of data recorded in a patterned configuration upon labels carried by labeled articles placed with random label orientation upon a conveyor: a scanning station; a conveyor movable through said scanning station; a label scanning device at said scanning station; and, means for controlling the direction of scan of said device to conform to said random orientation of the patterned data being scanned.

4. For automated processing of data recorded on a patterned configuration upon labels carried by labeled articles placed with random label orientation upon a conveyor: a scanning station; a conveyor movable through said scanning station; a label scanning device at said scanning station; means for producing a data translating scanning raster with said device; and, means for controlling the direction of scan of said device so as to conform said raster to the patterned configuration of the data recorded upon said randomly orientated label being scanned.

5. A data acquisition system comprising: a randomly orientated information field having data encoded thereupon; means for producing a raster of scan lines for translating said data to electronic signals; and, means, responsive to said scanning of said field, for controlling the direction of the component lines of said raster so as to conform it to the patterned configuration of the data recorded in said information field.

6. For electronic data processing equipment a data acquisition system comprising: a randomly orientated information field having optically sensible data encoded thereupon in a positional format; cathode ray beam means for scanning said field with an optical-electronic translating raster; and, means responsive to said scanning for adjusting the orientation of said raster to conform to said random orientation of said format.

7. For converting optically sensible data arranged in a two dimensional position matrix within a substantially rectangular information field into a series train of electronic pulse, apparatus comprising: an optical-electronic translating scanner; means for causing said scanner to produce a series of substantially parallel scan lines; means for measuring the effective length of separate ones of said lines from edge of scan to edge of field; means responsive to unequal measured lengths of a given number of said lines, for rotating the direction of said series of lines in discrete steps with respect to said information field; and, means responsive to equal measured lengths of said lines, for controlling said translating operation.

8. For converting optically sensible data contained within an information field to electronic signals, an electronic data processing system comprising: a television type camera tube having a target electrode with a signal storage characteristic; an optical system adapted to focus upon said target an image of said field when presented to the field of view of said system; means for traversing said target with individual scan lines of a cathode ray beam; means for deriving an electronic signal in response to the detection of an edge of said field during said scanning process; means for measuring, for given ones of said scan lines, the time from start of scan to edge of information field; means for comparing said measurements; means for changing the direction of said lines when said measured times are unequal; and, means for generating a data translating scanning raster when said measured times are equal.

9. A sales accounting system of the type wherein information labels are processed in random orientation through a label reading station comprising: an information label affixed to each item to be processed through the system, each of said labels having alpha-numeric and binary coded indication of the price to be charged for the item to which it is attached; said binary indication being contained within a fluorescent information field and comprising relatively opaque punched holes therein, said holes being arranged in the pattern of a given format; a cathode ray beam operated scanner arranged to traverse with a scanning raster said labels when presented to its optical field of view; a cathode ray beam deflection control system for said scanner; a video signal system responsive to the presence of said fluorescent information fields against a relatively opaque background and the presence of said holes when presented to the optical field of view of said scanner; means for rotating said raster to bring it into a desired direction of scan with respect to said format of said information field; price decoding equipment connected to said video system; and, price computation and display devices connected to sad decoding equipment.

10. For a data translating system wherein data stored in an optically sensible patterned arrangement within an optically sensible and randomly orientated information field is translated to electronic signals: a cathode ray beam scanning device; a beam deflection circuit for causing said device to produce a scanning raster; a video pickup circuit sensitive to the effect of said scanning beam upon said randomly orientated information field; and, a control circuit connected between said pickup and deflection circuits to cause said raster to track the pattern of said data arrangement in a manner controlled by a video response to the scanning of said field by said cathode ray beam.

11. For optical-electronic translation of data stored in an optically sensible patterned arrangement within an optically sensible and randomly orientated information field an optical-electronic transducer comprising: an optically sensitive scanner; means for causing said scanner to locate said field in a first scanning operation; means for causing said scanner to rotate its raster, in a second scanning operation, until it is in a desired orientation with respect to said randomly oriented field; and, means for performing a third scanning operation wherein said scanner is caused to track the pattern of said data arrangement.

12. A data translating system comprising: a cathode ray beam device; a video pickup circuit; a raster-controlling cathode ray beam deflection circuit; a control circuit, connected between said video pickup and said deflection circuit, for controlling the position of said raster said control circuit including means for rotating said raster in incremental steps; means for sensing the direction of said raster after each of said incremental rotations; and, means for ceasing said rotation when a desired direction of raster scanning is achieved.

13. Electronic data processing apparatus comprising: a cathode ray device; a video pickup circuit; a video signal switching subsystem; a raster-forming cathode ray deflection circuit; a raster-positioning control circuit connected between said video pickup and said deflection circuits, said control circuit including means for measuring the distance from edge-of-scan of said raster to a signal of a given character in said video pickup circuit; a video data output circuit connected to said video pickup circuit; and, a video data gating circuit connected between said video pickup and video data output circuits.

14. For optical-electronic translating of optically sensible data contained within an optically sensible information field, apparatus comprising: a cathode ray device; a raster-forming cathode ray beam deflecting circuit; a video pickup circuit; a video signal switching circuit; a raster-positioning control circuit connected between said video pickup and said deflection circuits, said control circuit including means for measuring the distance from edge-of-scan of said raster to a reference point on said information field; a video data output circuit connected to said video pickup circuit; a video data gating circuit connected to said output circuit; and, a data gate control circuit connected between said video pickup and said gating circuits.

References Cited by the Examiner

UNITED STATES PATENTS

| | | | |
|---|---|---|---|
| 2,404,030 | 7/1946 | Browne | 315—27 |
| 2,687,253 | 8/1954 | McMillan | 235—61.11 |
| 2,704,634 | 3/1955 | Rauch | 235—61.11 |
| 2,906,819 | 9/1959 | Smith | 235—61.115 |
| 2,919,426 | 12/1959 | Rohland | 340—149.1 |
| 2,989,587 | 6/1961 | Bedford | 178—7.2 |
| 2,991,462 | 7/1961 | Hose | 340—347 |
| 2,994,862 | 8/1961 | Preston | 340—347 |

FOREIGN PATENTS 650,536 2/1951 Great Britain.

OTHER REFERENCES

Fink, Donald G.: Television Engineering, pages 567, 574, 1952.

ROBERT C. BAILEY, *Primary Examiner.*

WALTER W. BURNS, Jr., MALCOLM A. MORRISON, *Examiners.*